United States Patent [19]

Drumbor et al.

[11] Patent Number: 5,594,221
[45] Date of Patent: Jan. 14, 1997

[54] HIGH AMPERE-CIRCUIT BREAKER SECONDARY DISCONNECT ARRANGEMENT

[75] Inventors: Rebecca C. Drumbor, Farmington; William H. Calder, Plainville, both of Conn.; Martin C. Ignasiak, Sarasota, Fla.

[73] Assignee: General Electric Company, New York, N.Y.

[21] Appl. No.: 386,847

[22] Filed: Feb. 10, 1995

[51] Int. Cl.⁶ .................................................. H01H 9/20
[52] U.S. Cl. .................... 200/50.27; 200/50.26; 361/605
[58] Field of Search .................... 200/50 AA, 50.21, 200/50.28; 361/605, 606, 607, 608, 609, 615

[56] References Cited

U.S. PATENT DOCUMENTS

| | | | |
|---|---|---|---|
| 2,689,898 | 9/1954 | West | 361/608 X |
| 2,917,592 | 12/1959 | Craig et al. | 200/50.27 |
| 3,197,583 | 7/1965 | Goodwin, Jr. et al. | 200/50.27 X |
| 3,553,407 | 1/1971 | Hauser | 200/50 AA X |
| 3,920,938 | 11/1975 | Netzel et al. | 200/50 AA |
| 4,001,742 | 1/1977 | Jencks et al. | 335/173 |
| 4,139,748 | 2/1979 | Wolfe et al. | 200/50 AA |
| 4,395,602 | 7/1983 | Castonguay | 200/50 AA |
| 4,477,701 | 10/1984 | Castonguay et al. | 200/50 AA |
| 4,658,323 | 4/1987 | Dougherty | 361/79 |
| 4,743,715 | 5/1988 | Gerbert-Gaillard et al. | 200/50 AA |
| 4,801,907 | 1/1989 | Kelaita, Jr. et al. | 335/20 |
| 5,434,369 | 7/1995 | Tempco et al. | 200/50 AA |

OTHER PUBLICATIONS

Calder et al Circuit Breaker Terminal Screw Assembly Ser. No. 08/305,539 filed on Sep. 14, 1994.

*Primary Examiner*—J. R. Scott
*Attorney, Agent, or Firm*—Richard A. Menelly; Carl B. Horton

[57] ABSTRACT

A secondary disconnect arrangement, in the form of a plug connector attached to the sides of a high ampere-rated circuit breaker assembly, interacts with a receptacle connector attached to the inner side walls of a circuit breaker enclosure. Movement of the circuit breaker in and out of the enclosure automatically connects and disconnects the plug connector from the receptacle connector. Terminals arranged on the plug connector on one side of the circuit breaker connect with internal circuit breaker components for communication and control functions, while terminals arranged on the plug connector on the opposite side provide connection between the internal circuit breaker components and remote auxiliary devices.

6 Claims, 4 Drawing Sheets

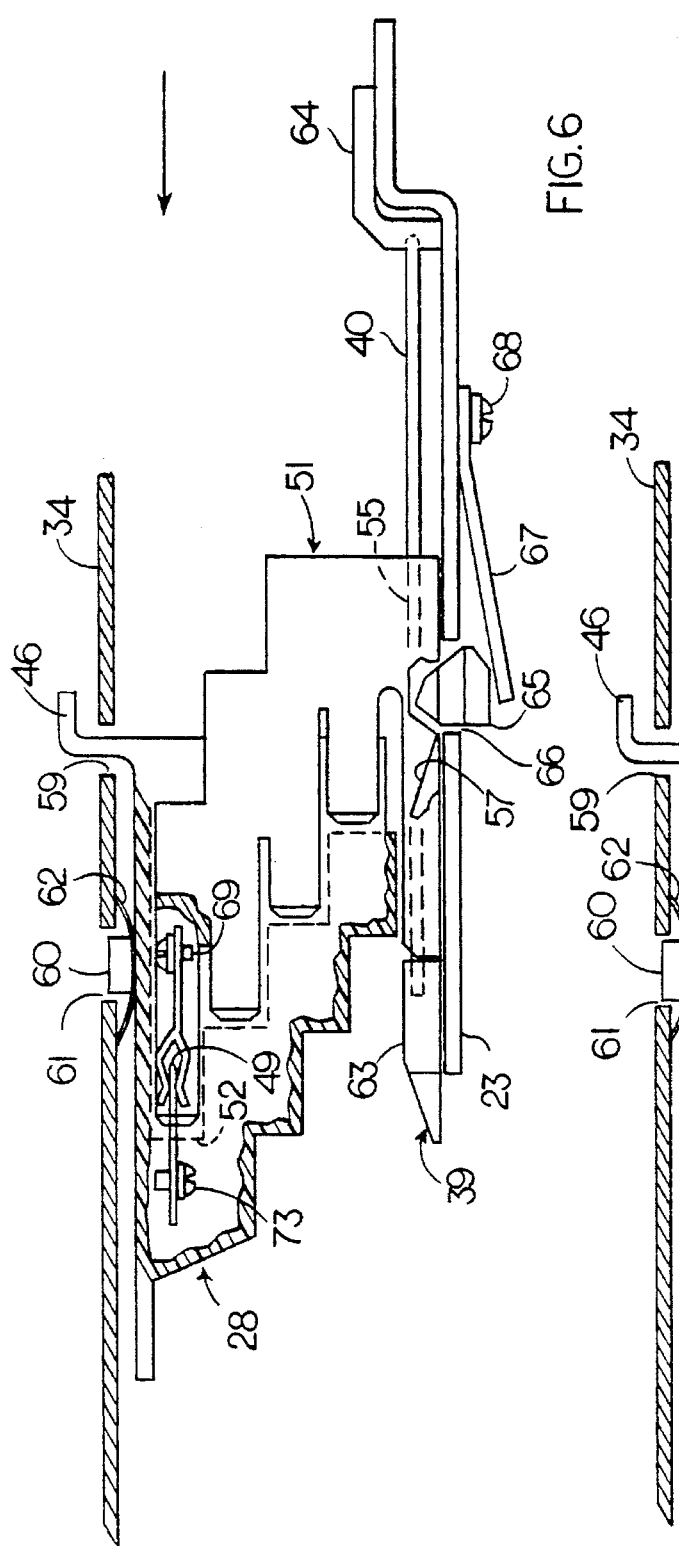
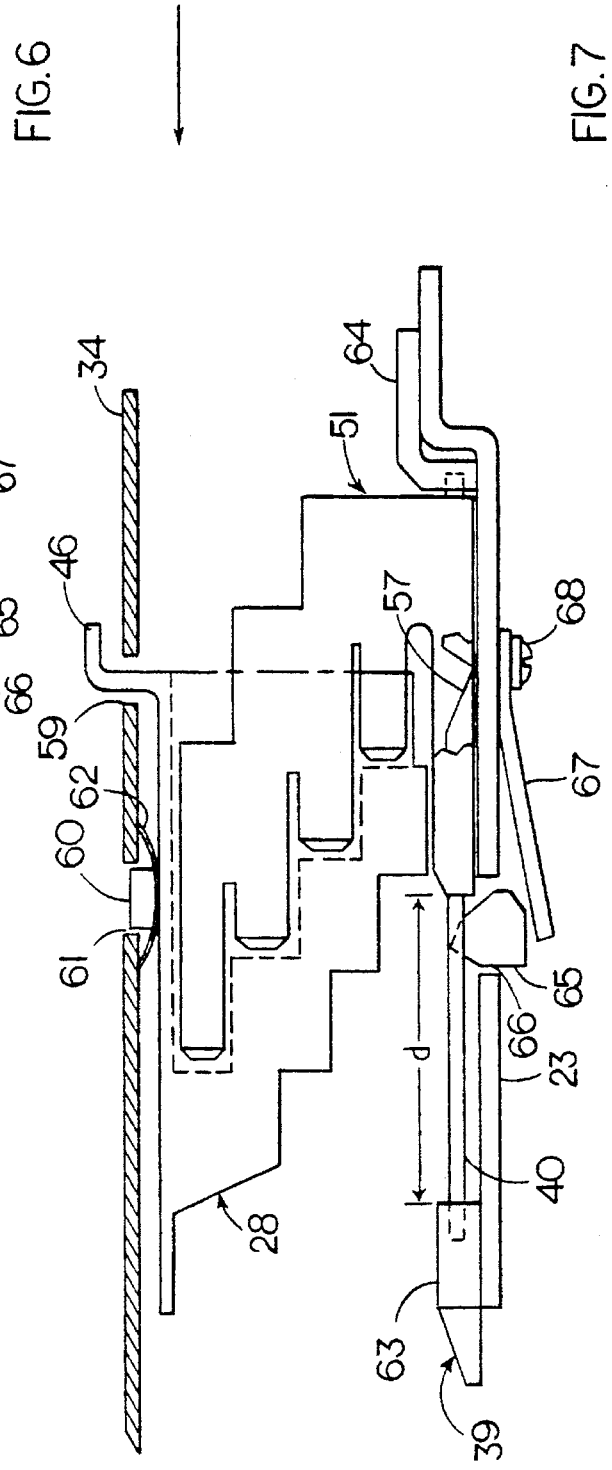

HIGH AMPERE-CIRCUIT BREAKER SECONDARY DISCONNECT ARRANGEMENT

BACKGROUND OF THE INVENTION

High ampere-rated circuit breakers such as described within U.S. Pat. No. 4,001,742 entitled "Circuit Breaker Having Improved Operating Mechanism" are capable of interrupting several thousand amperes of circuit current at several hundred volts potential. Electrical terminals are used with such circuit breakers for connection with remote accessories for indication and control purposes. To facilitate connection with the connectors on the terminals, the insulative terminal assemblies are generally attached to the exterior of the circuit breaker case. U.S. patent application Ser. No. 08/305,539 filed Sep. 14, 1994 entitled "Crimp On Screw Terminal Assembly" describes the attachment of terminal assemblies to an exterior part of the circuit breaker case to provide connection with internal electrical components.

In some industrial applications, it is necessary to mount the circuit breaker within an enclosure and move the circuit breaker in and out of the enclosure to make and break electrical connection within an electrical power distribution circuit. In such arrangements the terminals arranged on the outside surface of the circuit breaker assembly are arranged for automatic connection and disconnection from terminals arranged within the enclosure. Such terminal are then considered "secondary disconnect" terminals to distinguish the terminals from the main primary current-carrying circuit breaker terminals. Examples of prior arrangements of such secondary disconnect terminals are found in U.S. Pat. No. 4,139,748 entitled "Secondary Contacts for Drawout Switchgear"; U.S. Pat. No. 4,477,701 entitled "Secondary Disconnect Plugs for Programmable Circuit Breakers" and U.S. Pat. No. 4,743,715 entitled "Draw-In and Draw-Out Mechanism of an Electrical Circuit Breaker with Main and Auxiliary Circuits".

When such circuit breakers are used to communicate with other similar circuit breakers as well as providing connection with remote auxiliary devices, a large number of secondary disconnects must be used to insure sufficient electrical connection for all these functions.

The purpose of this invention is to describe a multi-terminal disconnect arrangement having sufficient electrical terminal connectors to provide such a large number of supplemental electrical and electronic functions.

SUMMARY OF THE INVENTION

Electrical terminal assemblies are formed in a two-piece molded plug and receptacle arrangement to facilitate capture between the terminals when a large number of terminals are required. The plug assembly is arranged in an array of terminals that are stepped-upwardly to define a plurality of stab receiver connectors and is attached to the exterior side walls of the circuit breaker case. The receptacle assembly is arranged in an array of terminals that are stepped upwardly to define a corresponding plurality of stab connectors and is attached to the interior side walls of the circuit breaker compartment. The receptacle assembly is further shaped to define a rectangular cavity that receives the front part of the plug assembly to align and connect the stab connectors with the stab receiver connectors.

BRIEF DESCRIPTION OF THE DRAWINGS

FIG. 6 is a top plan view in partial section of the plug and receptacle components of the secondary disconnect assembly when the circuit breaker is in a test position; and FIG. 7 is a top plan view in partial section of the plug and receptacle components of the secondary disconnect assembly when the circuit breaker in an fully connected position.

DESCRIPTION OF THE PREFERRED EMBODIMENT

Figure 1:
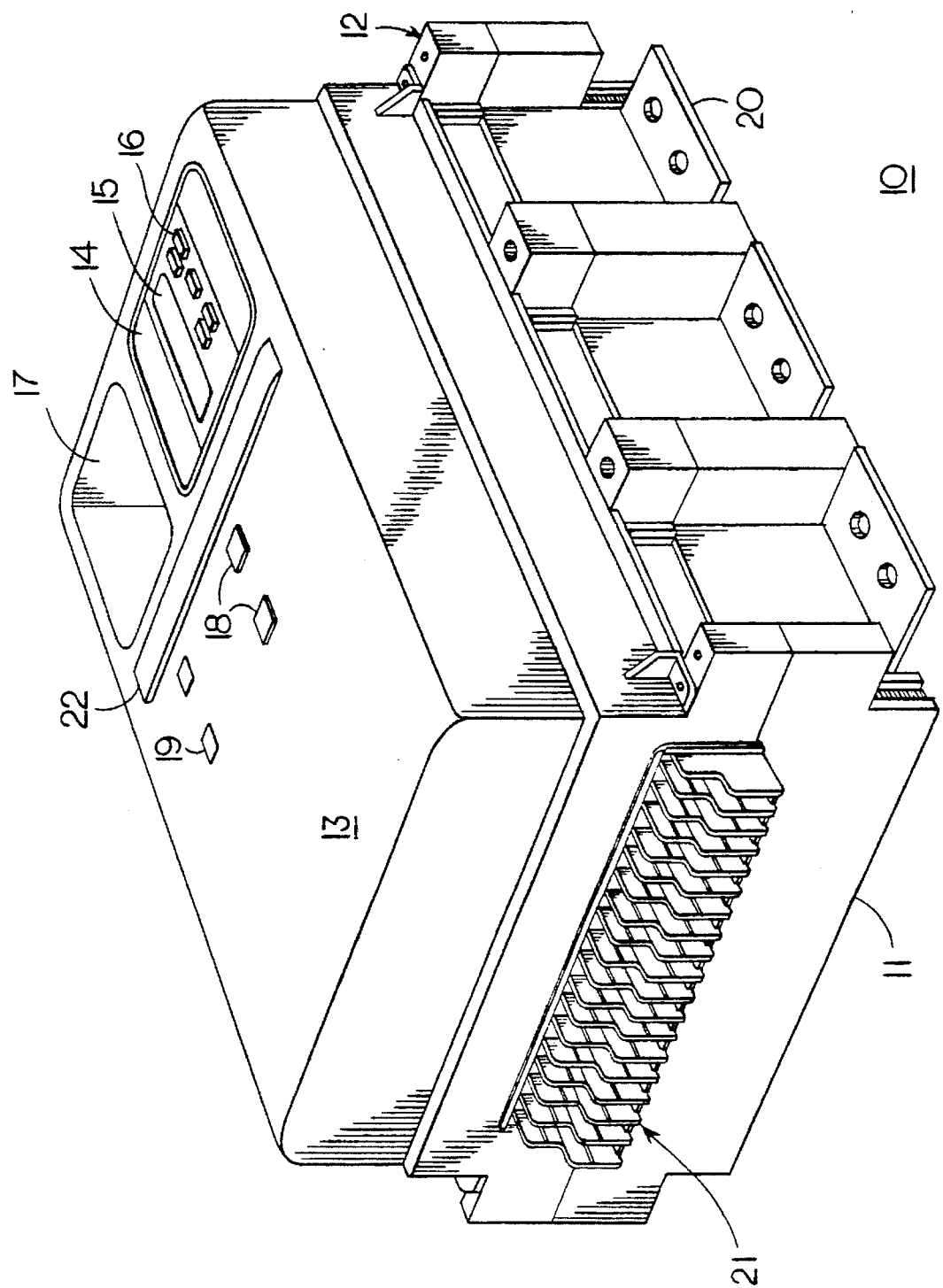
FIG. 1 is a top perspective view of a high ampere-rated circuit breaker employing a stationary terminal screw assembly according to the prior art.
Figure 2:
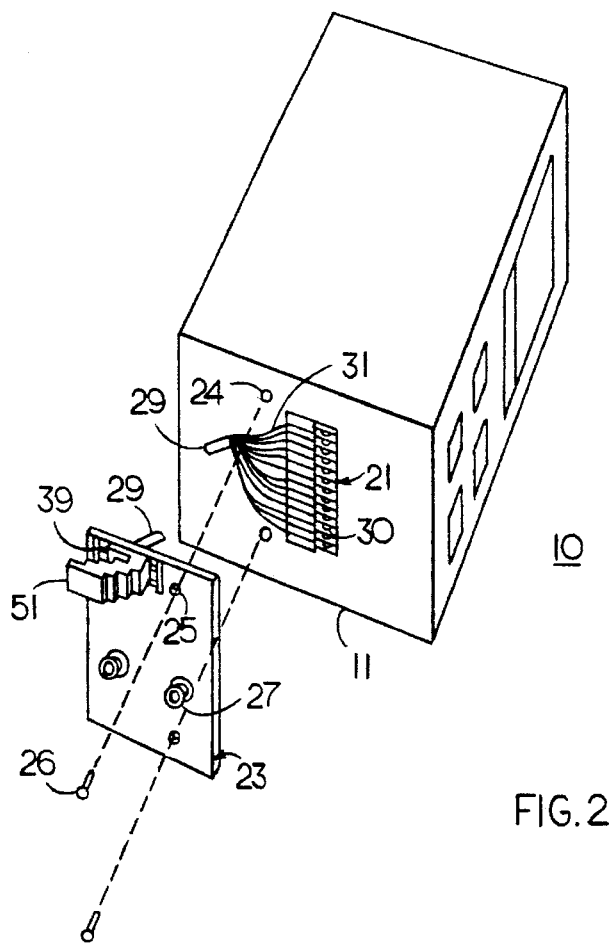
FIG. 2 is a top perspective view of the circuit breaker of FIG. 1 prior to attaching the secondary disconnect assembly according to the invention.

The high ampere-rated circuit breaker 10 shown in FIG. 1 is capable of transferring several thousand amperes quiescent circuit current at several hundred volts potential without overheating. The circuit breaker consists of an electrically insulated base 11 to which an intermediate cover 12 of similar insulative material is attached prior to attaching the top cover 13, also consisting of an electrically-insulative material. Electrical connection with the interior current-carrying components is made by load terminal straps 20 extending from one side of the base and line terminal straps (not shown) extending from the opposite side thereof. The interior components are controlled by an electronic trip unit 14 contained within the top cover 13 and which includes a display 15 and a keypad 16. Although not shown herein, the trip unit is similar to that described within U.S. Pat. No. 4,658,323 entitled "RMS Calculation Circuit For Digital Interrupters" and interacts further with an accessory contained within the accessory recess 17 to provide a range of protection and control functions such as described, for example within U.S. Pat. No. 4,801,907 entitled "Undervoltage Release Accessory For A Circuit Breaker Interior." The operating handle 22 allows manual operation of the circuit breaker operating mechanism to open and close the circuit breaker contacts. The contacts can be automatically opened and closed by means of the buttons 18 and the state of the contacts is indicated on the lamps 19. A terminal screw assembly 21 is attached to the junction between the insulated base 11 and the intermediate cover 12 and top cover 13 for electrical access to the accessory (not shown), trip unit 14 and other electrical components within the intermediate cover 12 and top cover 13. To convert the stationary breaker 10 to a retractable type circuit breaker a support plate 23 as shown in FIG. 2 is attached to the insulated base 11 by means of bolts 26 and thru-holes 24, 25. The secondary disconnect plug 51, hereafter "plug", which is mounted to the support plate by means of a support rail assembly 39, is electrically-connected with terminals 30 on the terminal block 21 by means of the wire conductors 31 within the multi-conductor cable 29. As described in the aforementioned U.S. Pat. No. 4,477,701, a pair of rollers 27 attached to the support plate 23 on the circuit breaker 10 are carried upon corresponding rails 32 affixed to the side walls 34, 35 of the circuit breaker compartment 33 as shown in FIG. 3.

Figure 3:
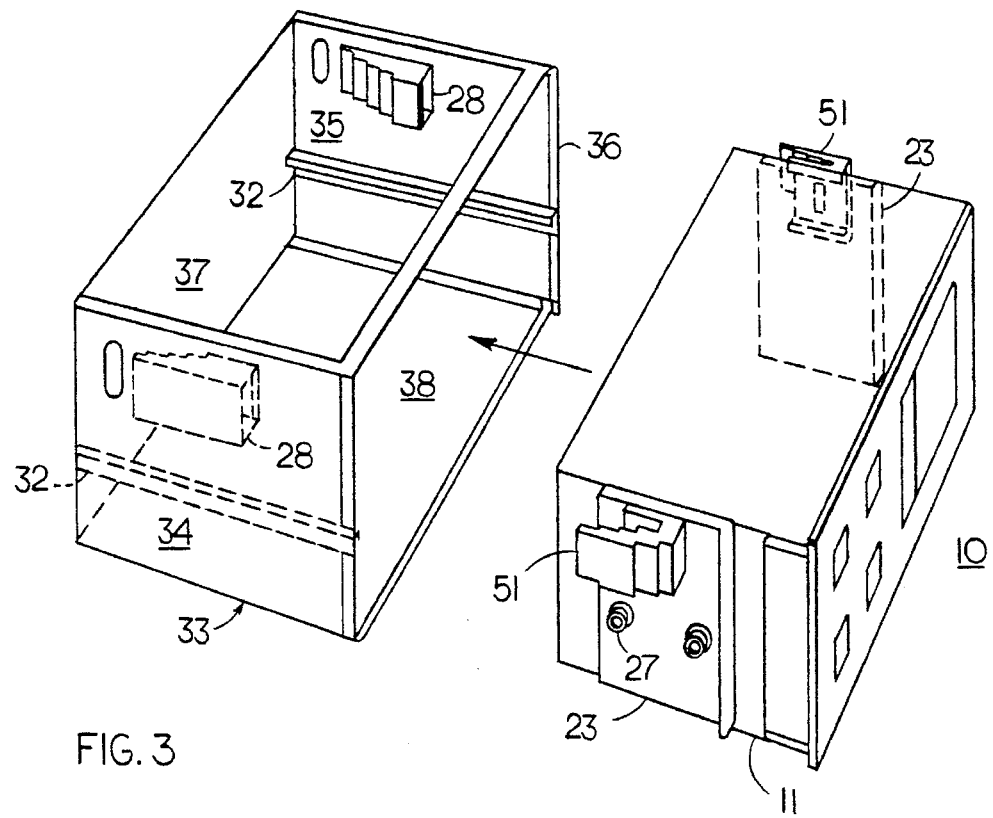
FIG. 3 is a top perspective view of the circuit breaker of FIG. 2 prior to insertion within a circuit breaker compartment.

As further shown in FIG. 3, a similar plug 51 and support plate 23 are mounted on opposite sides of the circuit breaker insulated base 11 to engage with the corresponding secondary disconnect receptacle 28, hereafter "receptacle" affixed to the interior side walls 34, 35 above the rails 32. The compartment 33 is in the form of a support frame 36 joined by the side walls 34, 35 and the rear wall 37 which houses the power stabs (not shown) which receive the power plugs (not shown) that extend from the rear of the breaker 10. The power plugs and stabs are omitted for purposes of clarity herein and operate in the manner fully described within the aforementioned U.S. Pat. No. 4,477,701 to energize the circuit breaker 10 when the circuit breaker is moved in the indicated direction within the front opening 38 of the compartment 33 by rollers 27 and rails 32.

Figure 4:
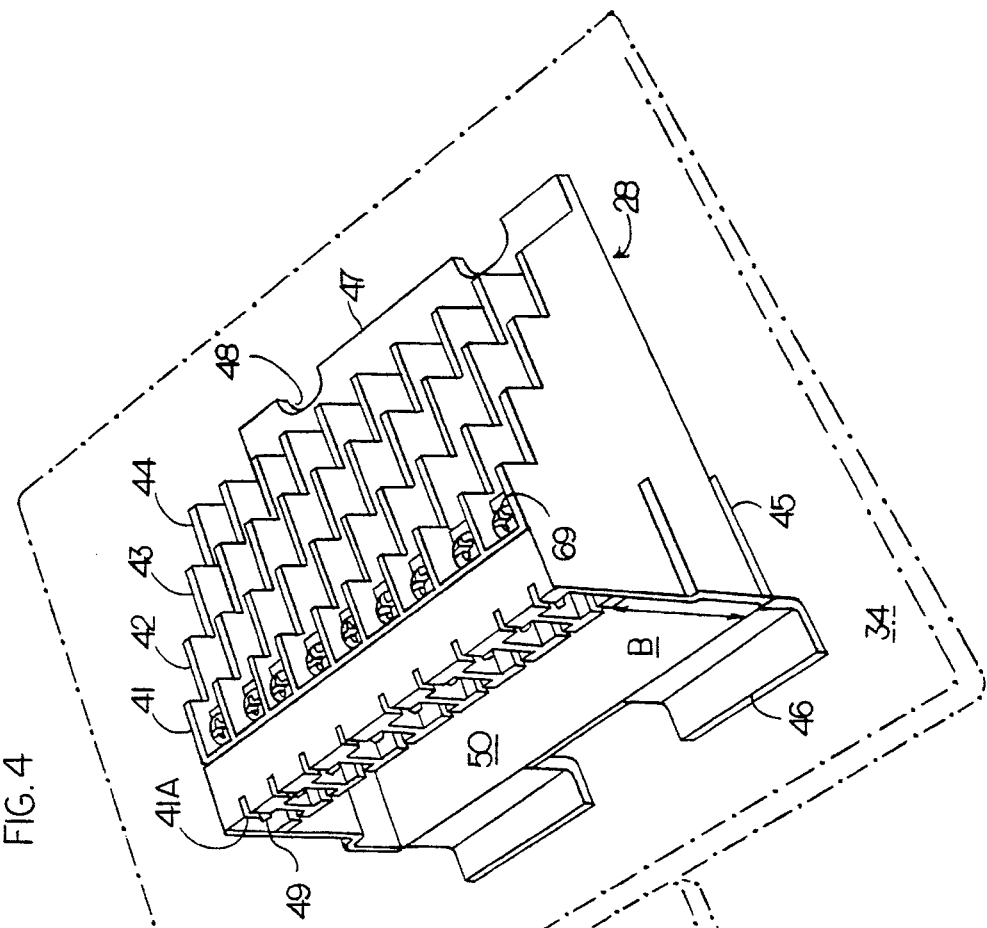
FIG. 4 is a top perspective view of the receptacle component of the secondary disconnect assembly of FIG. 2.
Figure 5:
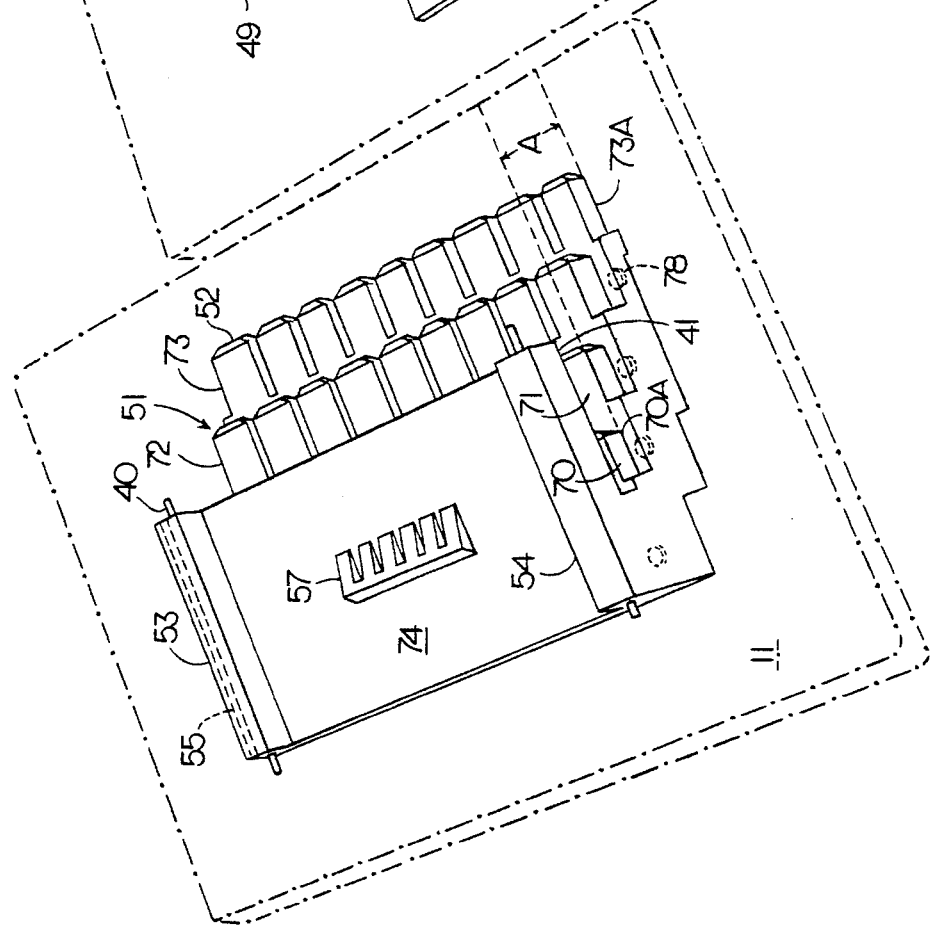
FIG. 5 is a top perspective view of the plug component of the secondary disconnect assembly of FIG. 2.

The interconnection between the plug 51 and receptacle 28 is best seen by now referring to FIG. 4 and FIG. 5. The plug 51 is attached to the exterior of the circuit breaker insulated base 11, which is indicated in phantom, and the receptacle 28 is attached to the interior of the compartment side wall 34 also indicated in phantom. The receptacle is formed from a single casting from thermoset or thermoplastic material and is integrally-formed into four stab terminal arrays 41 in descending step configuration that carries nine or more terminal screws 69. The base 45 is configured to form a forward tab 46 and a rear tab 47, with a pair of screw retainer slots 48 formed therein. Each array 41–44 includes a stab 49 that connects with a corresponding connector 52 on the corresponding connector terminal arrays 70–73 in descending step configuration that carries nine or more terminal screws 78. The plug 51 is likewise formed from a single casting of similar thermoset or thermoplastic material and includes a base 74 that is shaped to form a pair of tracks 53, 54 each of which include an elongate slot 55 that carry the rods 40, 44 that form part of the support rail 39 shown earlier in FIG. 2. An important feature of the invention is the provision of the chamber 50 that extends within the receptacle 28 and is limited at a top part by means of the bottom of the arrays 41–44 and at the bottom part by means of the base 45. The dimension B defined between the bottom surface 41A and the base 45 of the receptacle 28 is set to provide a press-fit connection relative to the dimension A defined between the top surface 70A of the first array 70 and the bottom surface 73A of the fourth array 73 of the base 51 when the base is inserted in the receptacle.

The extension 57 extending from the base 74 interacts with a cam projection 65 that extends through a slot 66 in the support plate 23 that carries the plug 51 when the plug is moved in and out of connection with the receptacle 28 as best seen by now referring to FIG. 6 and FIG. 7. As described earlier, the receptacle 28 is fixedly attached to the side wall 34 as depicted in FIG. 6. The stud 60, integrally-formed within the bottom of the receptacle 28 extends through a compression washer 62 within an opening 61 formed in the side wall 34. The tab 46 extends through an opening 59 to position and support the receptacle on the side wall 34. The plug 51 is supported on rods 40 extending through the elongated slots 55. The rods 40 extend between the L-shaped support 64 at one end to the rectangular support 63 at the opposite end thereof and both 63 and 64 are attached to support plate 23. In the so-called "test" position, with the circuit breaker power plugs out of electrical connection with the corresponding power stabs within the circuit breaker compartment as described earlier, the plug 51 connects with the receptacle 28 to provide secondary disconnect power to the related components and accessories. In this position, the detent 57 is held against the cam 65 extending through the opening 66 in the support plate 23. The cam is biased against the support plate by means of the flat spring 67 that is attached to the support plate by means of the screw 68. The cam 65 acting against detent 57 provides sufficient resistant force to fully connect the plug 51 with the receptacle 28. When the circuit breaker 10 of FIG. 3 is further advanced within the compartment 33 to the so-called "connect" position whereby both the circuit breaker power stabs as well as the secondary disconnects are energized, as depicted in FIG. 7, the detent 57 is behind the cam 65 such that the plug 51 is stopped from further travel by its engagement with the receptacle 28 when the circuit breaker is moved in the indicated direction completely within the compartment. Further movement of the circuit breaker is taken up as lost motion by the travel of the rod 40 the distance d along the support plate 23 to allow the plug to remain connected within the receptacle 28. Withdrawal of the circuit breaker from the compartment causes the cam 65 to slide up and over the detent 57 back to the "test" position shown in FIG. 6. The L-shaped support 65 is now against the end of the plug 51. Further withdrawal of the circuit breaker causes the plug 51 to be withdrawn from the receptacle 28 to thereby de-energize the secondary disconnects.

Means have herein been described for allowing automatic connection and disconnection between secondary disconnects associated with a retractable high ampere-rated circuit breaker as the circuit breaker is moved into and out from a circuit breaker compartment.

We claim:

1. A circuit breaker secondary disconnect arrangement comprising:

a secondary disconnect plug mounted to an exterior of a circuit breaker, said circuit breaker having means for movement in and out of an associated circuit breaker compartment, said plug including a plurality of connector arrays of connectors arranged in a step-wise configuration; and a secondary disconnect receptacle mounted to an interior of said circuit breaker compartment said receptacle being arranged to accept a part of said disconnect plug, said receptacle including a plurality of stab arrays arranged in a step-wise configuration.

2. The disconnect arrangement of claim 1 wherein said plug is attached to said circuit breaker exterior by a support plate.

3. The disconnect arrangement of claim 1 wherein receptacle is shaped relative to said part of said disconnect plug for capturing said part of said disconnect plug in a press-fit relation.

4. The disconnect arrangement of claim 1 wherein said receptacle includes an integrally-formed support and wherein said means defined to accept part of said disconnect plug extends between said support and said stab arrays.

5. The disconnect arrangement of claim 2 including a detent extending from a plug base integrally-formed therein, wherein said support plate includes a cam extending through an opening in said support plate, said cam being spring-loaded against said base plate by a spring whereby said cam interacts with said detent to hold said receptacle in engagement with said plug When said circuit breaker is moved within said compartment.

6. The disconnect arrangement of claim 5 including a pair of opposing tracks 53, 54 formed on said plug base, said opposing tracks including extended slots 55 for slideable movement of said plug along said tracks.

* * * * *